(12) United States Patent
Xiao et al.

(10) Patent No.: US 9,253,547 B2
(45) Date of Patent: Feb. 2, 2016

(54) METHODS AND SYSTEMS FOR FACILITATING REMOTE CONTROL OF A TELEVISION BY A SUPPORT TECHNICIAN

(71) Applicant: Verizon Patent and Licensing Inc., Arlington, VA (US)

(72) Inventors: Hong Xiao, Acton, MA (US); Azim Nasir, Foxboro, MA (US); Jianxiu Hao, Lexington, MA (US); Haiyan Zhou, Winchester, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 13/664,877

(22) Filed: Oct. 31, 2012

(65) Prior Publication Data

US 2014/0123180 A1 May 1, 2014

(51) Int. Cl.
*H04N 7/173* (2011.01)
*H04N 21/647* (2011.01)
*H04N 21/6543* (2011.01)
*H04L 12/24* (2006.01)
*H04N 21/6547* (2011.01)
*H04L 29/08* (2006.01)
*H04N 21/4788* (2011.01)
*H04N 21/81* (2011.01)

(52) U.S. Cl.
CPC .......... *H04N 21/647* (2013.01); *H04L 41/5061* (2013.01); *H04L 41/5074* (2013.01); *H04L 67/125* (2013.01); *H04N 21/4788* (2013.01); *H04N 21/6473* (2013.01); *H04N 21/64723* (2013.01); *H04N 21/64746* (2013.01); *H04N 21/64753* (2013.01); *H04N 21/6543* (2013.01); *H04N 21/6547* (2013.01); *H04N 21/8173* (2013.01)

(58) Field of Classification Search
CPC .......... H04N 21/647; H04N 21/64723; H04N 21/6473; H04N 21/64746; H04N 21/64753; H04N 21/6543; H04N 21/6547
USPC ............................................ 725/37, 105–110
See application file for complete search history.

(56) References Cited

U.S. PATENT DOCUMENTS

| | | | | |
|---|---|---|---|---|
| 6,091,803 | A * | 7/2000 | Thompson ...................... | 379/37 |
| 6,219,648 | B1 * | 4/2001 | Jones et al. ................... | 705/7.39 |
| 6,615,258 | B1 * | 9/2003 | Barry et al. ................... | 709/223 |
| 2002/0006212 | A1 * | 1/2002 | Rhoads et al. ................ | 382/100 |
| 2003/0065731 | A1 * | 4/2003 | Mohammed et al. ......... | 709/208 |
| 2003/0066080 | A1 * | 4/2003 | Kamieniecki .................. | 725/80 |
| 2008/0166105 | A1 * | 7/2008 | Vanderhoff .................... | 386/124 |
| 2009/0310764 | A1 * | 12/2009 | Gerhart ..................... | 379/142.04 |
| 2010/0098230 | A1 * | 4/2010 | Bhow ........................ | 379/202.01 |
| 2010/0115568 | A1 * | 5/2010 | Gupta et al. .................. | 725/106 |
| 2010/0238500 | A1 * | 9/2010 | Teramoto et al. ............ | 358/1.15 |
| 2011/0016492 | A1 * | 1/2011 | Morita ............................ | 725/58 |
| 2011/0103562 | A1 * | 5/2011 | Tritt .............................. | 725/37 |
| 2012/0230484 | A1 * | 9/2012 | Kannappan et al. ..... | 379/202.01 |
| 2012/0321062 | A1 * | 12/2012 | Fitzsimmons et al. ... | 379/142.17 |

* cited by examiner

Primary Examiner — Jeremy Duffield

(57) ABSTRACT

An exemplary method includes a remote support management system 1) receiving a television support request from a user of a television, 2) generating, in response to the television support request, a ticket identifier associated with the television support request, and 3) facilitating, in accordance with the ticket identifier, remote control of the television by a support technician by way of a computing device associated with the support technician. Corresponding methods and systems are also disclosed.

21 Claims, 17 Drawing Sheets

Appointment Scheduler — 1302

| Monday | Tuesday | Wed. | Thursday | Friday | Saturday | Sunday |
|--------|---------|------|----------|--------|----------|--------|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 1 | 2 | 3 | 4 |

Submit — 1304

Fig. 13

METHODS AND SYSTEMS FOR FACILITATING REMOTE CONTROL OF A TELEVISION BY A SUPPORT TECHNICIAN

BACKGROUND INFORMATION

Modern televisions are often network enabled and hence may be used in a variety of different ways. For example, in addition to presenting television shows, movies, and other types of media content programs, a television may be capable of executing applications (commonly referred to as "apps"), presenting network content (e.g., web content), and performing a host of other functions. Unfortunately, a user may occasionally have problems with one or more of the television's functions. For example, the user may need help interacting with a particular application (e.g., a video streaming application) being executed by the television. To this end, the user may communicate with a support technician employed by a provider of the application. Unfortunately, it is often difficult for the support technician to help the user without being able to view what is being presented by the television.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 9-15 illustrate various interfaces that may be presented in accordance with the methods and systems described herein.

DETAILED DESCRIPTION OF PREFERRED EMBODIMENTS

Figure 1:
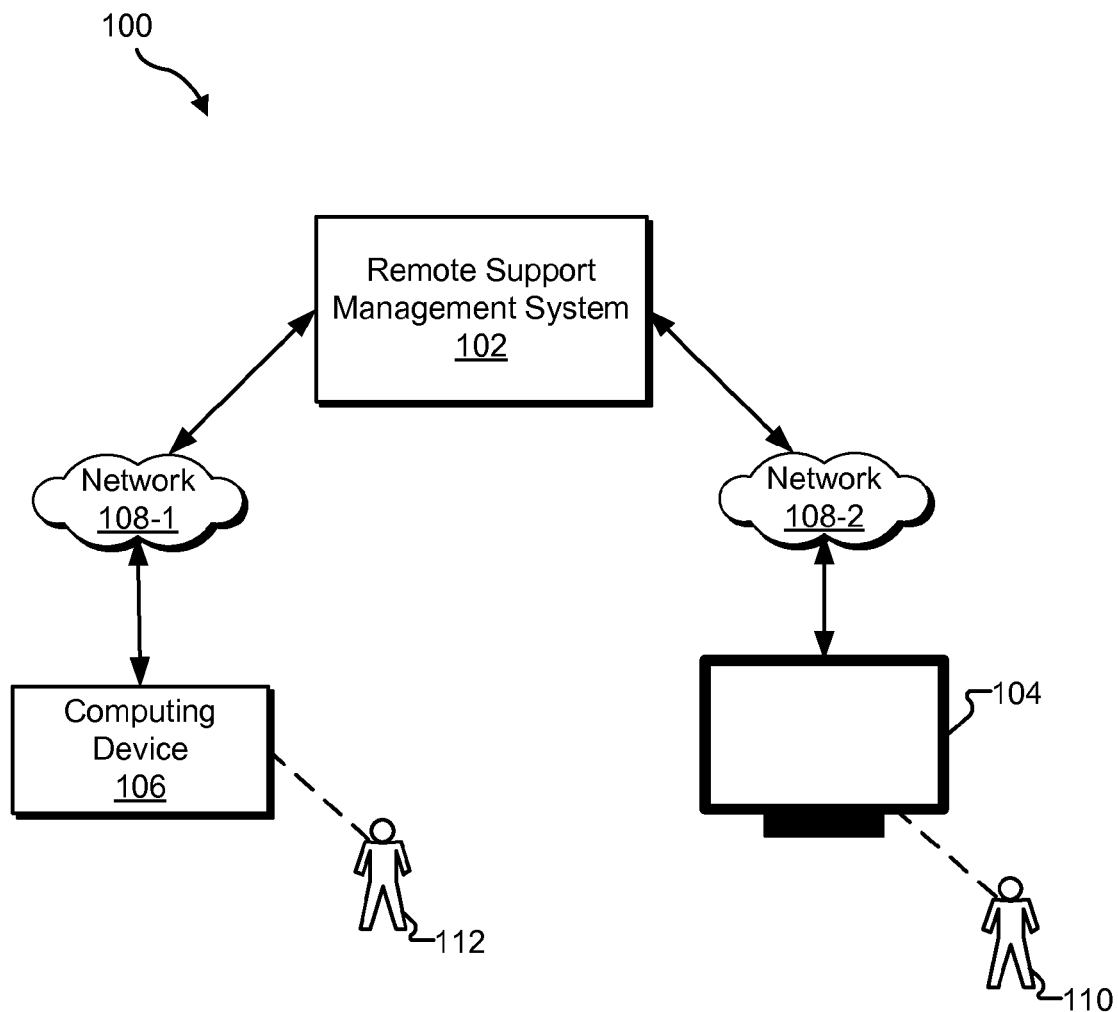
FIG. 1 illustrates an exemplary configuration in which a remote support management system is communicatively coupled to a television and to a computing device according to principles described herein.

Methods and systems for facilitating remote control of a television by a support technician are described herein. As will be described below, a remote support management system may 1) receive a television support request from a user of a television, 2) generate, in response to the television support request, a ticket identifier associated with the television support request, and 3) facilitate, in accordance with the ticket identifier, remote control of the television by a support technician by way of a computing device associated with the support technician.

To illustrate, a user of a television may be using a video streaming application executed by the television and experience technical difficulties with the application. To receive help in resolving the technical difficulties, the user may access a support interface associated with the application by which the user may provide a description of the technical difficulties that he or she is experiencing. Data representative of the description may be transmitted in the form of a television support request to the remote support management system, which, in response, may generate a ticket identifier ("ticket ID") associated with the television support request. The remote support management system may then transmit the ticket ID back to the television, which may present the ticket ID within the support interface to the user. The remote support management system may also provide the support technician with the ticket ID (e.g., by presenting the ticket ID within an interface displayed by a computing device used by the support technician).

The ticket ID may then be used to establish a remote control session between the support technician's computing device and the user's television. For example, the user may call the support technician for help with the technical difficulties. If the support technician decides that he or she needs to view what is being displayed by the television in order to address the technical difficulties, the support technician may ask the user for the ticket ID. The user may then provide the ticket ID to the support technician (e.g., by telling the support technician what the ticket ID is over the phone). The support technician may either enter the ticket ID into an interface provided by the computing device or select the ticket ID from a list of ticket IDs already presented within the interface being displayed by the computing device. The remote support management system may verify the ticket ID provided by the support technician and establish a communication channel between the computing device and the television. As will be described below, the communication channel may be used to facilitate remote control of the television by the support technician.

Various benefits may be realized in accordance with the methods and systems described herein. For example, by allowing a support technician to view what is being displayed by a television in real time as the support technician addresses one or more issues associated with the television, the methods and systems described herein may provide a user of a television with an effective, efficient, and relatively immediate solution to an issue that the user is experiencing with the television and/or with an application being executed by the television. This, in turn, benefits a provider of the television and/or an application being executed by the television in terms of revenue, quality of service, and customer loyalty.

FIG. 1 illustrates an exemplary configuration 100 in which a remote support management system 102 is communicatively coupled to a television 104 and to a computing device 106. Each of these components will be described in more detail below.

Remote support management system 102, television 104, and computing device 106 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

In the example of FIG. 1, remote support management system 102 is communicatively coupled to computing device 106 by way a first network 108-1 and to television 104 by way of a second network 108-2. First and second networks 108-1 and 108-2 (collectively "networks 108") may each include one or more networks or types of networks capable of carrying communications and/or data signals. For example, each network 108 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks. While networks 108-1 and 108-2 are shown to be separate networks in FIG. 1, it will be recognized that, in some examples, networks 108-1 and 108-2 may alternatively be a single network (e.g., the Internet).

As shown, a user 110 may be associated with television 104. User 110 may include a viewer, owner, or other user of television 104. A support technician 112 may be associated with computing device 106. Support technician 112 may include any person or entity that provides support for television 104 and/or for one or more features associated with television 104. For example, support technician 112 may be employed or otherwise associated with a provider of television 104, a provider of an application executed by television 104, a provider of an external device configured to be connected to television 104 (e.g., a provider of a gaming console, etc. configured to be connected to television 104), a third party not associated directly with television 104 and/or any of the features associated with television 104, and/or any other entity as may serve a particular implementation.

Remote support management system 102 may be configured to facilitate remote control of television 104 by computing device 106 (i.e., by support technician 112 using computing device 106). To this end, remote support management system 102 may be implemented by any combination of computing devices (e.g., servers) as may serve a particular implementation. Remote support management system 102 will be described in more detail below.

Television 104 may include any type of television device configured to be able to communicate with remote support management system 102 by way of network 108-2. For example, television 104 may include a network-enabled standalone television, a television 104 configured to communicate by way of network 108-2 by way of an external device (e.g., a set-top box device, a game console, etc.) coupled to television 104. In some examples, television 104 may be configured to execute one or more applications, such as media streaming applications, Internet browsing applications, support applications, and/or any other type of application as may serve a particular implementation. Television 104 will be described in more detail below.

Computing device 106 may be implemented by any suitable computing device configured to be utilized by support technician 112 in order to remotely control television 104. For example, computing device 106 may be implemented by one or more mobile devices (e.g., mobile phones, tablet computers, laptop computers) and/or personal computers. In some examples, computing device 106 may be configured to execute and/or otherwise access a support application configured to facilitate remote control of one or more televisions (e.g. television 104).

Figure 2:
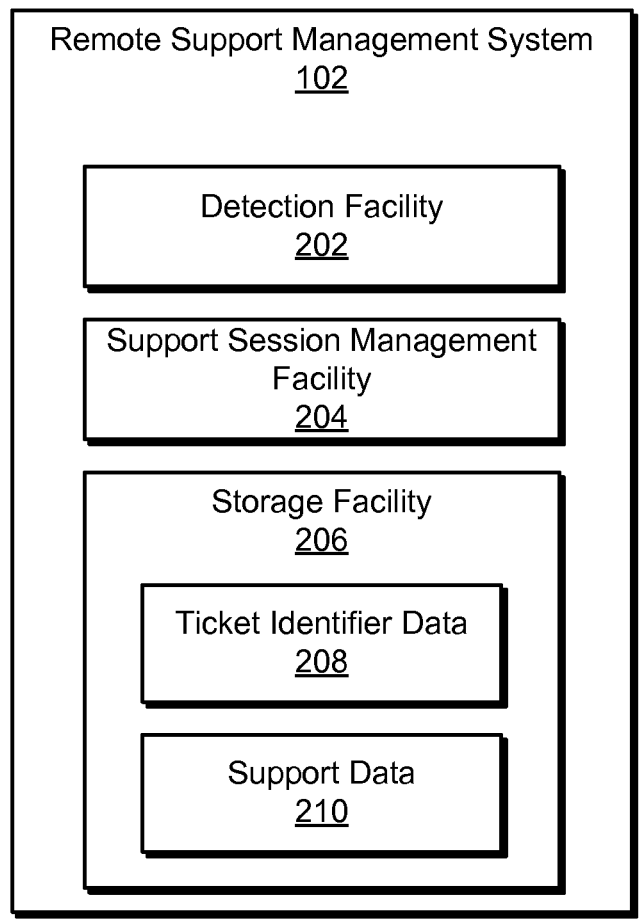
FIG. 2 illustrates exemplary components of a remote support management system according to principles described herein.

FIG. 2 illustrates exemplary components of remote support management system 102. As shown, remote support management system 102 may include a detection facility 202, a support session management facility 204, and a storage facility 206 selectively and communicatively coupled to one another. It will be recognized that although facilities 202-206 are shown to be separate facilities in FIG. 2, any of facilities 202-206 may be combined into fewer facilities, such as into a single facility, or divided into more facilities as may serve a particular implementation.

Detection facility 202 may be configured to receive (e.g., detect) a television support request from a user of a television (e.g. from user 110 of television 104). The television support request may be provided by the user in any suitable manner. For example, as will be described below, the user may utilize a support interface presented by way of the television to provide the television support request.

The television support request may include any suitable type of information as may serve a particular implementation. For example, the television support request may include a written description of an issue associated with the television (e.g., an issue that the user is having with the television itself and/or with an application being executed by the television). Additionally or alternatively, the television support request may include a recorded audio description of the issue associated with the television. As will be described in more detail below, the written and/or recorded audio descriptions may be provided by the user by way of a support interface presented by way of the television.

In some examples, the television support request may include a television identifier associated with the television. The television identifier may be representative of one or more attributes of the television. For example, the television identifier may identify a make and model of the television, one or more network capabilities of the television, an identity of one or more applications executed by the television, a user profile of the user associated with the television, and/or any other information related to the television and/or the user as may serve a particular implementation. As will be described below, this information may be used by the support technician to provide a customized support solution for the user.

Support session management facility 204 may be configured to perform one or more support session management operations as may serve a particular implementation. For example, support session management facility 204 may generate, in response to the television support request received by detection facility 202, a ticket identifier associated with the television support request and facilitate remote control of the television by a support technician in accordance with the ticket identifier.

Support session management facility 204 may generate a ticket identifier associated with a television support request in any suitable manner. For example, support session management facility 204 may process the information included in the television support request, open a support ticket associated with the television support request, and assign a unique ticket identifier associated with the support ticket to the television support request. The ticket identifier may be of any suitable form. For example, the ticket identifier may include a ticket number and/or any other combination of characters as may serve a particular implementation.

Support session management facility 204 may facilitate remote control of the television by the support technician in any suitable manner. For example, support session management facility 204 may use the ticket identifier to establish a remote control session between a computing device (e.g., computing device 106) associated with the support technician and the television. Exemplary manners in which support session management facility 204 may use the ticket identifier to establish the remote control session between the computing device and the television will be described below.

In some examples, support session management facility 204 may facilitate remote control of the television by the support technician by way of the computing device by providing an interactive graphical representation of a remote control device associated with the television for presentation within an interface displayed by the computing device. The support technician may then interact with the graphical representation of the remote control device in order to remotely control the television. For example, support session management facility 204 may detect a selection by the support technician of a button included in the interactive graphical representation of the remote control device and, in response, transmit a remote control command associated with the button to the television. The television may respond to the remote control command provided by the support technician as it would respond to the same remote control command being provided by the user pressing the same button on an actual remote control device associated with the television.

Additionally or alternatively, support session management facility 204 may facilitate remote control of the television by the support technician by way of the computing device by receiving data from the television representative of screen images in substantially real time as the screen images are displayed by the television and dynamically providing the data representative of the screen images to the computing device as the data is received. The computing device may then process (e.g., decode) the data representative of the screen images and present the screen images for viewing by the support technician. Additionally or alternatively, support session management facility 204 may relay data representative of sound associated with the screen images from the television to the computing device so that the computing device may also present the sound associated with the screen images.

As mentioned, support session management facility 204 may be configured to provide a support interface for presentation to the user by way of the television. The support interface may be associated with the television itself and/or an application being executed by the television. As will be described in more detail below, the user may provide the television support request by way of the support interface.

In some examples, support session management facility 204 may be configured to provide an interactive appointment scheduler for presentation within the support interface. The user may use the interactive appointment scheduler to schedule an appointment (also referred to herein as a "support appointment") for the support technician to provide support for the television at a later date and/or time. This may be beneficial when the user desires to receive support for the television during a time period in which the user is not planning on using the television.

As mentioned, the television support request provided by the user may include a television identifier associated with the television. In some examples, support session management facility 204 may use the television identifier to identify one or more attributes of the television and/or the user. Support session management facility 204 may then provide information representative of the identified one or more attributes to the support technician by way of the computing device.

Additionally or alternatively, support session management facility 204 may customize the remote control of the television by the support technician by way of the computing device in accordance with the identified one or more attributes. For example, support session management facility 204 may use the information to identify the make and model of the television, a make and model of a remote control device associated with the television, and/or any other characteristic specific to the television so that the television and/or remote control device may be more accurately portrayed in an interface presented by the computing device to the support technician.

Storage facility 206 may be configured to store ticket identifier data 208 representative of one or more ticket identifiers generated by support session management facility 204 and support data 210 generated or utilized by support session management facility 204. Storage facility 206 may maintain additional or alternative data as may serve a particular implementation.

Figure 3:
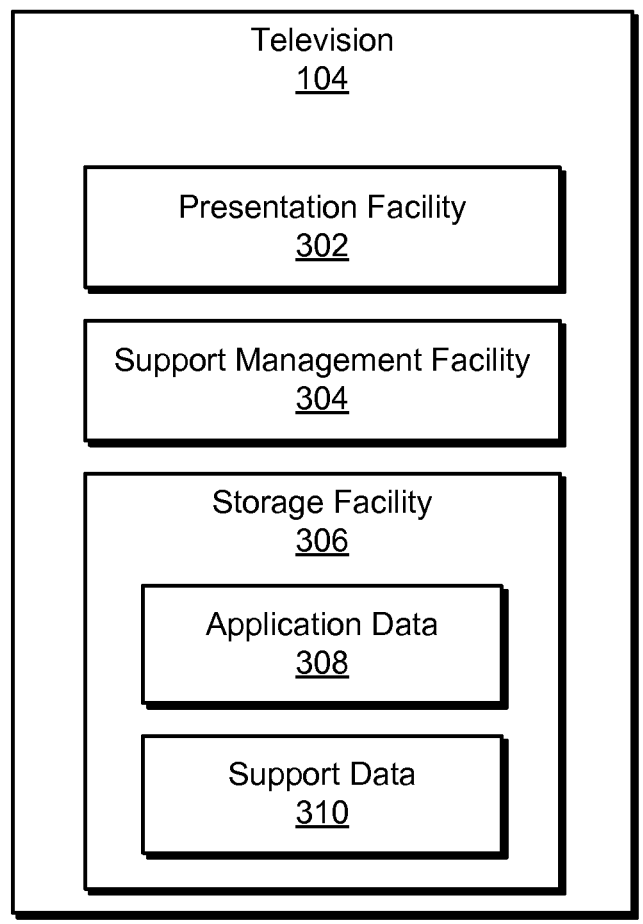
FIG. 3 illustrates exemplary components of a television according to principles described herein.

FIG. 3 illustrates exemplary components of television 104. As shown, television 104 may include a presentation facility 302, a support management facility 304, and a storage facility 306 selectively and communicatively coupled to one another. It will be recognized that although facilities 302-306 are shown to be separate facilities in FIG. 3, any of facilities 302-306 may be combined into fewer facilities, such as into a single facility, or divided into more facilities as may serve a particular implementation.

Presentation facility 302 may be configured to present media content. For example presentation facility 302 may present one or more television programs, movies, video games, multimedia applications, and/or any other type of media content as may serve a particular implementation.

In some examples, presentation facility 302 may be configured to present a support interface to a user of television 104. The support interface may be provided by television 104 itself, remote support management system 102, and/or any other device or entity as may serve a particular implementation. As described above, the support interface may be used by a user to provide a television support request to remote support management system 102.

Support management facility 304 may be configured to perform one or more support management operations. For example, support management facility 304 may receive a television support request from the user by way of the support interface presented by presentation facility 302, transmit data representative of the television support request to remote support management system 102, receive data representative of a ticket identifier generated by remote support management system 102 in response to the request, and present the ticket identifier within the support interface. As will be described in more detail below, the user may then use the ticket identifier to allow a support technician to remotely control television 104.

In some examples, support management facility 304 may be further configured to detect an establishment of a support session between television 104 and computing device 106 associated with the support technician by way of remote support management system 102. In response, support management facility 304 may provide data representative of screen images to remote support management system 102 in substantially real time as the screen images are displayed by television 104. As described previously, remote support management system 102 may relay the data representative of the screen images to the computing device so that computing device 106 may present the screen images to the support technician in substantially real time as the screen images are being presented by television 104.

Storage facility 306 may be configured to store application data 308 representative of one or more applications that may be executed by television 104 and support data 310 generated or utilized by support management facility 304. Storage facility 306 may maintain additional or alternative data as may serve a particular implementation.

Figure 4:
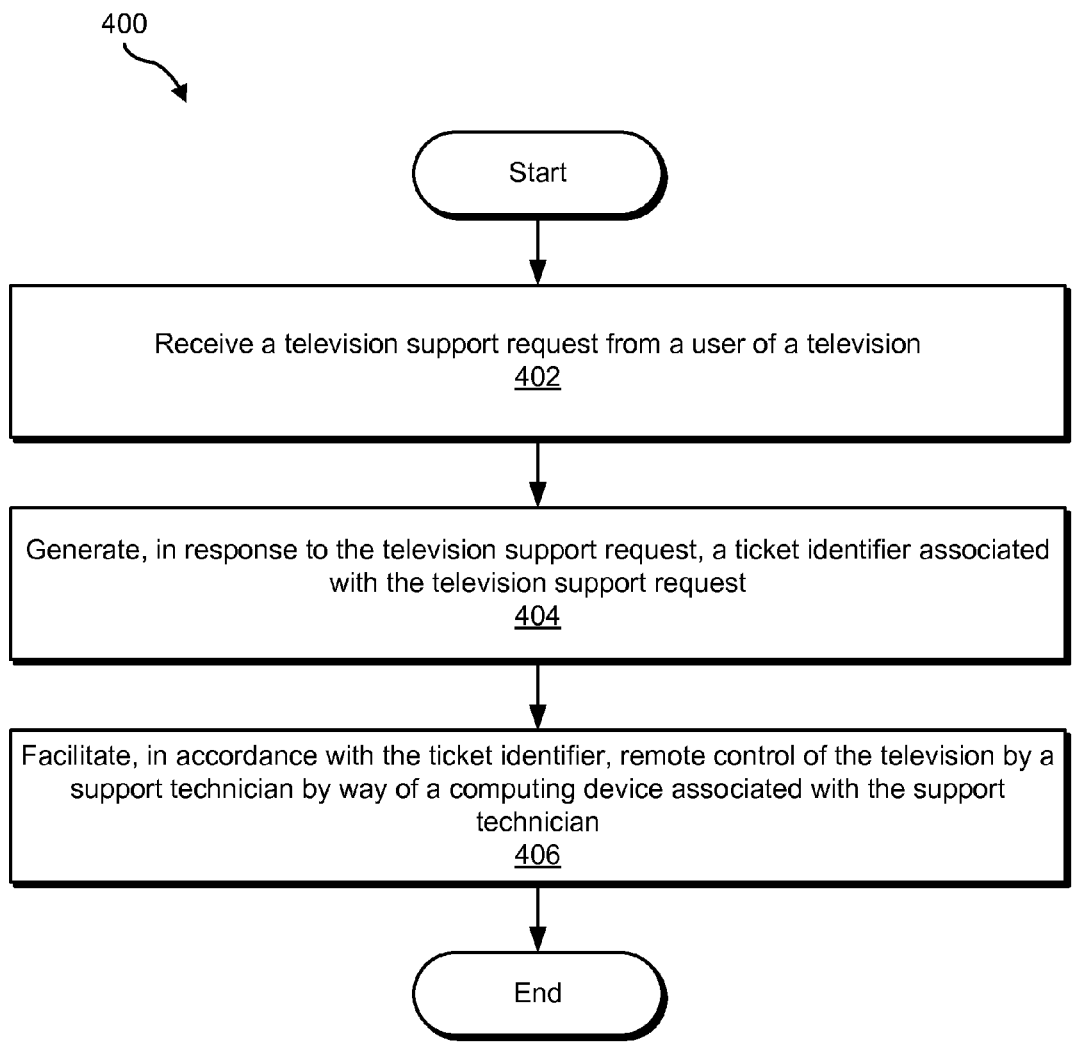
FIG. 4 illustrates an exemplary method of facilitating remote control of a television by a support technician according to principles described herein.

FIG. 4 illustrates an exemplary method 400 of facilitating remote control of a television by a support technician. While FIG. 4 illustrates exemplary steps according to one embodiment, other embodiments may omit, add to, reorder, and/or modify any of the steps shown in FIG. 4. One or more of the steps shown in FIG. 4 may be performed by remote support management system 102 and/or any implementation thereof.

In step 402, a remote support management system receives a television support request from a user of a television. Step 402 may be performed in any of the ways described herein.

In step 404, the remote support management system generates, in response to the television support request, a ticket identifier associated with the television support request. Step 404 may be performed in any of the ways described herein.

In step 406, the remote support management system facilitates, in accordance with the ticket identifier, remote control of the television by a support technician by way of a computing device associated with the support technician. Step 406 may be performed in any of the ways described herein. For example, the remote support management system may facilitate remote control of the television by the support technician by way of the computing device by using the ticket identifier to establish a remote control session between the computing device and the television. Various ways in which the remote support management system may use the ticket identifier to establish a remote control session between the computing device and the television will now be described.

In some examples, the remote support management system may use the ticket identifier to establish a remote control session between the computing device and the television substantially immediately upon receiving the television support request from the user. This may occur when the user indicates that he or she desires relatively immediate help with an issue that he or she is experiencing with the television (as opposed to when the user indicates that he or she would like to schedule a support appointment for a future time, which case will be described below).

Figure 5:
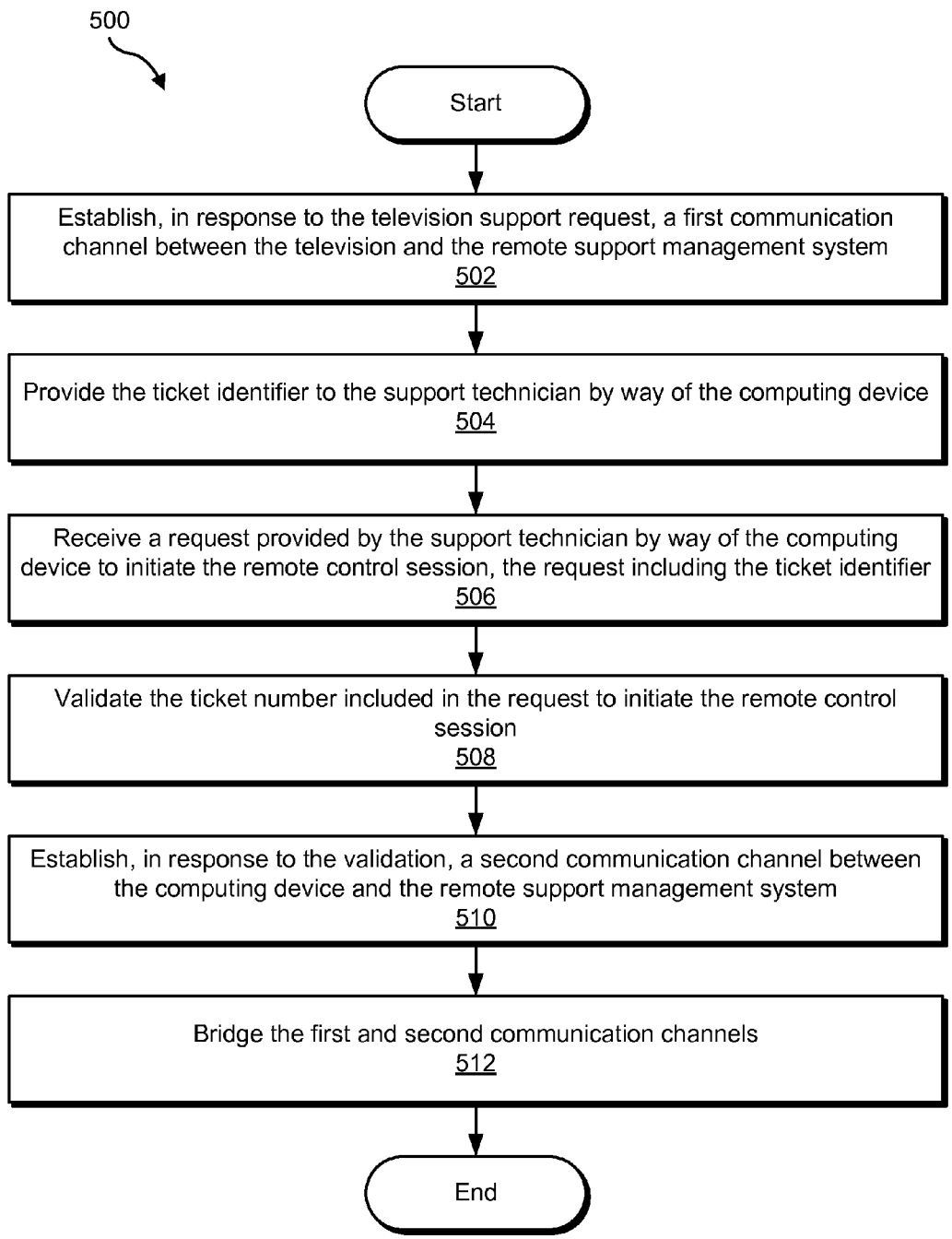
FIG. 5 illustrates an exemplary method that may be performed in order to establish a remote control session according to principles described herein.

To illustrate, FIG. 5 illustrates an exemplary method 500 that may be performed by a remote support management system (e.g., remote support management system 102) in order to establish a remote control session between a computing device (e.g., computing device 106) and a television (e.g., television 104) substantially immediately upon receiving a television support request from a user of the television. While FIG. 5 illustrates exemplary steps according to one embodiment, other embodiments may omit, add to, reorder, and/or modify any of the steps shown in FIG. 5.

In step 502, the remote support management system may establish, in response to the television support request, a first communication channel between the television and the remote support management system. This may be performed in any suitable manner. For example, the television support request may include a television identifier associated with the television. The remote support management system may use the television identifier to verify one or more settings of the television (e.g., one or more support privileges associated with the television) and, in response, establish a communication channel between the television and the remote support management system.

In step 504, the remote support management system may provide the ticket identifier to the support technician by way of the computing device. This may be performed in any suitable manner. For example, the remote support management system may provide the ticket identifier for presentation within an interface displayed by the computing device, transmit data representative of the ticket identifier to the computing device in the form of a message (e.g., an email, a text message, etc.), and/or in any other suitable manner. An example of this will be provided in more detail below.

In step 506, the remote support management system may receive a request to initiate the remote control session from the computing device. The request may be provided by the support technician and may include the ticket identifier. The request may be provided in any suitable manner. For example, if the ticket identifier is presented within an interface displayed by the computing device, the support technician may provide the request by selecting the ticket identifier presented within the interface.

In step 508, the remote support management system may validate the ticket identifier included in the request to initiate the remote control session. This may be performed in any suitable manner. For example, the remote support management system may analyze the ticket identifier to determine that it matches the ticket identifier associated with the television support request and/or otherwise process the ticket identifier.

In step 510, the remote support management system may establish, in response to a successful validation of the ticket identifier, a second communication channel between the computing device and the remote support management system. The second communication channel may be established in any suitable manner.

In step 512, the remote support management system may bridge the first and second communication channels. This may be performed in any suitable manner that allows the television and computing device to communicate one with another by way of the remote support management system.

Figure 6:
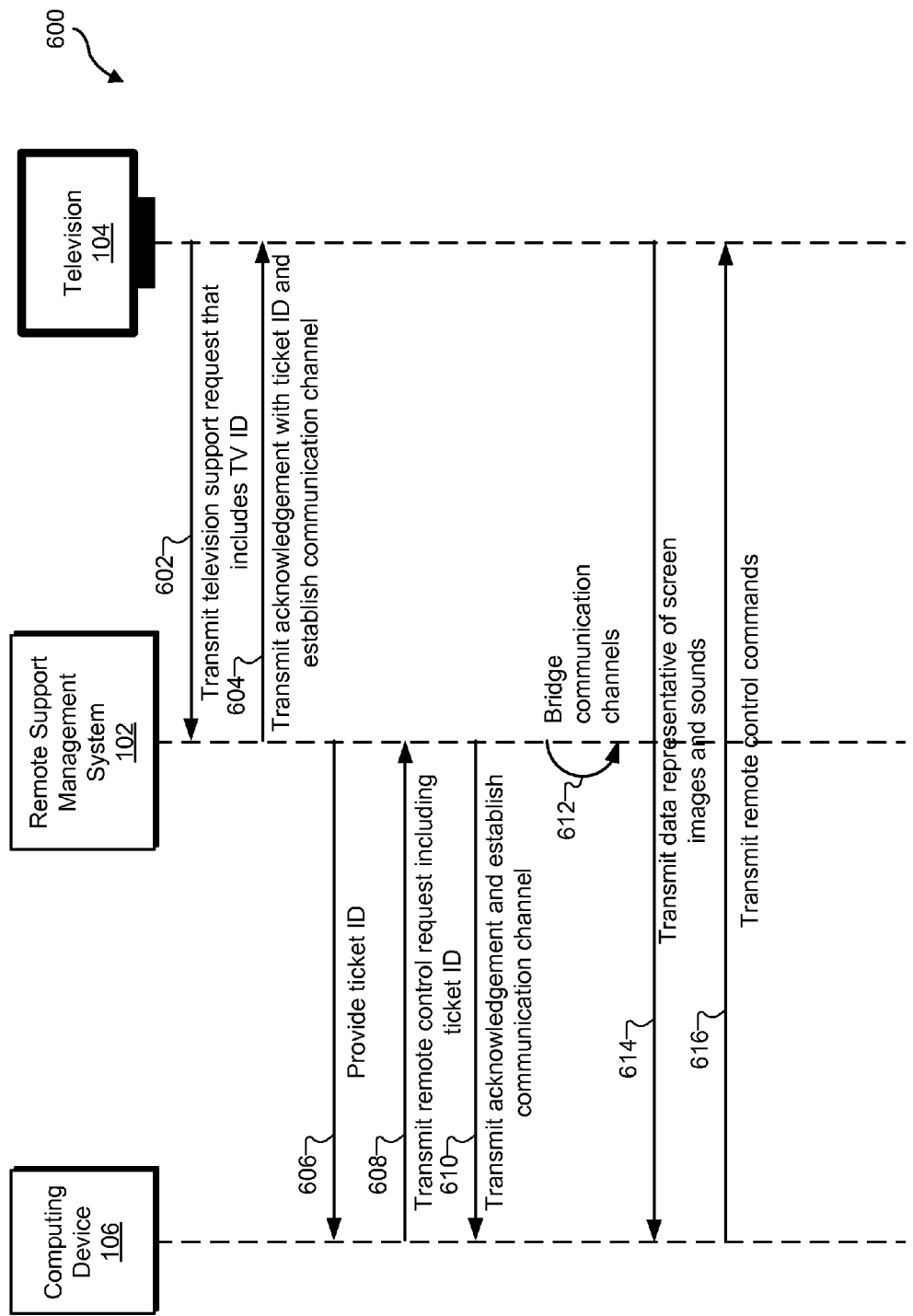
FIG. 6 shows a sequence diagram that may be realized in accordance with the methods and systems described herein.

FIG. 6 shows an exemplary sequence diagram 600 that illustrates various steps that may be performed by remote support management system 102, television 104, and computing device 106 as remote support management system 102 implements method 500. While FIG. 6 illustrates exemplary steps according to one embodiment, other embodiments may omit, add to, reorder, and/or modify any of the steps shown in FIG. 6.

In step 602, television 104 transmits a television support request that includes a television identifier associated with television 104 to remote support management system 102. As shown in step 604, remote support management system 102 may process the television support request (e.g., in any of the ways described herein), transmit data representative of an acknowledgement of the request together with a ticket identifier associated with the request back to television 104, and establish a communication channel between remote support management system 102 and television 104.

In step 606, remote support management system 102 may provide the ticket identifier to computing device 106. This may be performed in any of the ways described herein. In step 608, computing device 106 may transmit a remote control request including the ticket identifier to remote support management system 102. This may be performed, for example, in response to the support technician associated with computing device 106 selecting the ticket identifier from a list of ticket identifiers presented within an interface displayed by computing device 106.

Remote support management system 102 may verify the ticket identifier included in the remote control request and, as shown in step 610, transmit an acknowledgment of the remote control request to computing device 106 and establish a communication channel between computing device 106 and remote support management system 102.

In step 612, remote support management system 102 may bridge the first and second communication channels. Data may then be transmitted between television 104 and computing device 106 by way of remote support management system 102. For example, as shown in step 614, television 104 may transmit data representative of screen images and sounds to computing device 106 by way of the bridged communication channels. Likewise, as shown in step 616, computing device 106 may transmit remote control commands to television 104 by way of remote support management system 102. The support technician may additionally or alternatively access and/or control one or more settings, data logs, and/or other attributes of television 104 by way of the bridged communication channels.

As mentioned, a user may alternatively desire to schedule an appointment for the support technician to provide support for the television at a later date and/or time. This may be beneficial, for example, when the user desires to receive support for the television during a time period in which the user is not planning on using the television.

To this end, as described above, the user may utilize an interactive appointment scheduler (described in more detail below) to provide a request for the remote control session to begin at a scheduled time. Remote support management system 102 may then establish the remote control session at the scheduled time.

Figure 7:
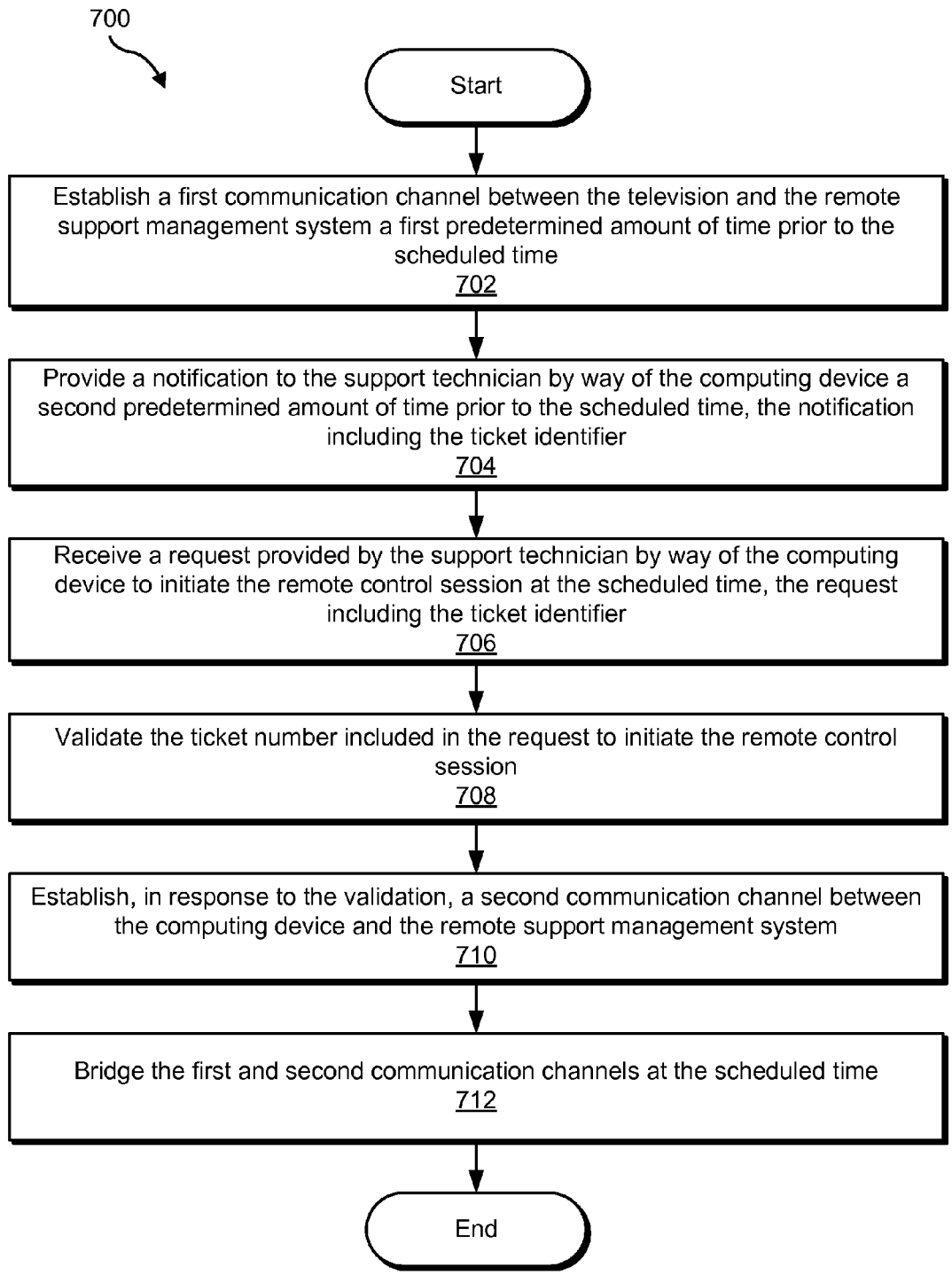
FIG. 7 illustrates another exemplary method that may be performed in order to establish a remote control session according to principles described herein.

To illustrate, FIG. 7 illustrates an exemplary method 700 that may be performed by a remote support management system (e.g., remote support management system 102) in order to establish a remote control session between a computing device (e.g., computing device 106) and a television (e.g., television 104) at a scheduled time. While FIG. 7 illustrates exemplary steps according to one embodiment, other embodiments may omit, add to, reorder, and/or modify any of the steps shown in FIG. 7.

In step 702, the remote support management system may establish a first communication channel between the television and the remote support management system a first predetermined amount of time (e.g., five minutes) prior to the scheduled time. This may be performed in any of the ways described herein.

In step 704, the remote support management system may provide a notification that includes the ticket identifier to the support technician by way of the computing device a second predetermined amount of time (e.g., three to five minutes) prior to the scheduled time. The notification may be in any suitable form. For example, as will be illustrated below, the notification may include a message configured to be presented within an interface displayed by the computing device.

In step 706, the remote support management system may receive a request provided by the support technician by way of the computing device to initiate the remote control session at the scheduled time. In some examples, the request includes the ticket identifier. The request to initiate the remote control session may be provided by the support technician in any of the ways described herein.

In step 708, the remote support management system may validate the ticket identifier included in the request to initiate the remote control session. This may be performed in any suitable manner. For example, the remote support management system may analyze the ticket identifier to determine that it matches the ticket identifier associated with the television support request and/or otherwise process the ticket identifier.

In step 710, the remote support management system may establish, in response to a successful validation of the ticket identifier, a second communication channel between the computing device and the remote support management system. The second communication channel may be established in any suitable manner.

In step 712, the remote support management system may bridge the first and second communication channels at the scheduled time. This may be performed in any suitable manner that allows the television and computing device to communicate one with another by way of the remote support management system beginning at the scheduled time.

Figure 8:
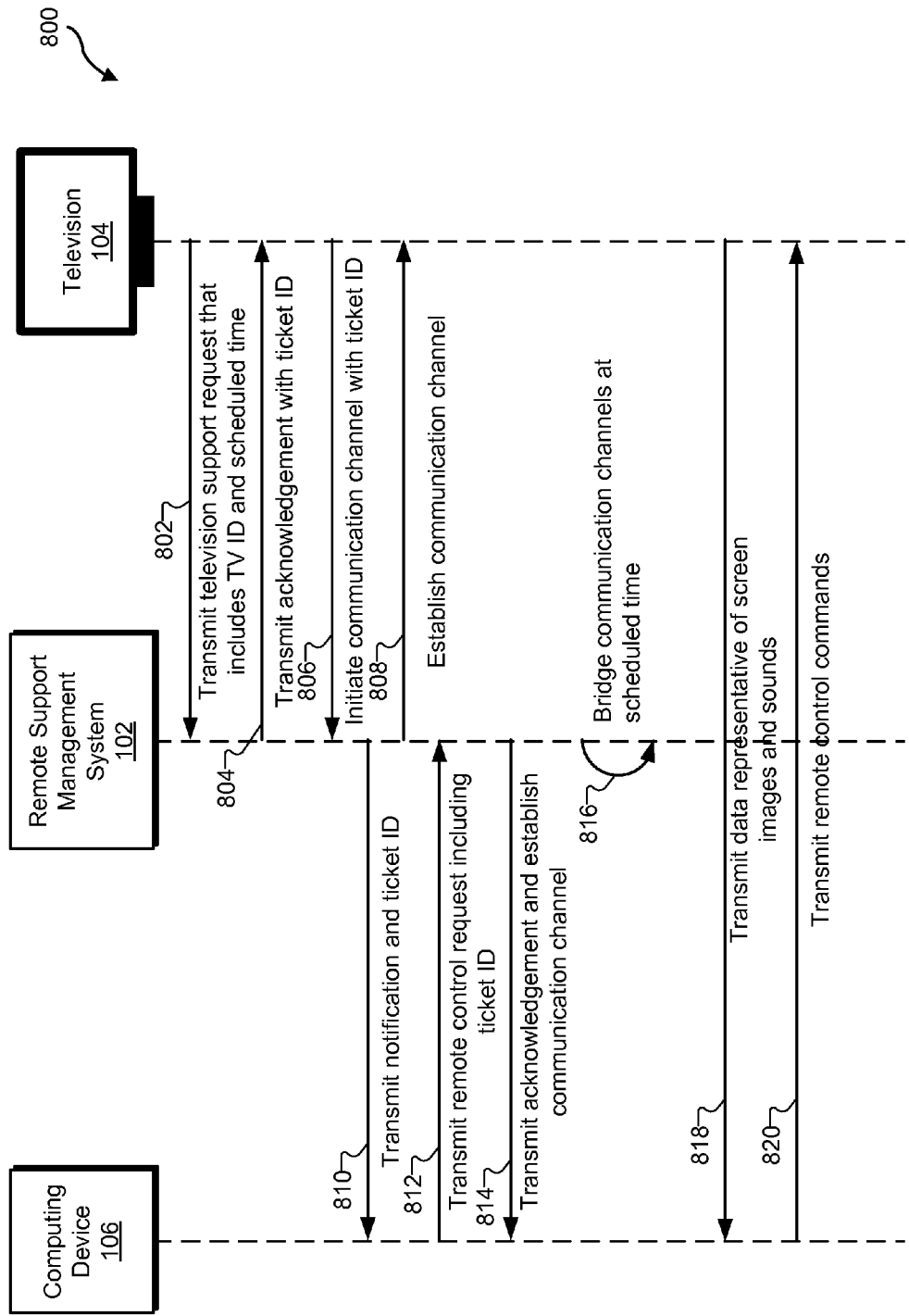
FIG. 8 shows another sequence diagram that may be realized in accordance with the methods and systems described herein.

FIG. 8 shows an exemplary sequence diagram 800 that illustrates various steps that may be performed by remote support management system 102, television 104, and computing device 106 as remote support management system 102 implements method 700. While FIG. 8 illustrates exemplary steps according to one embodiment, other embodiments may omit, add to, reorder, and/or modify any of the steps shown in FIG. 8.

In step 802, television 104 transmits a television support request that includes both a television identifier associated with television 104 and data representative of a scheduled time (i.e., a scheduled time at which the remote control session is to begin) to remote support management system 102.

As shown in step 804, remote support management system 102 may process the television support request (e.g., in any of the ways described herein) and transmit data representative of an acknowledgement of the request together with a ticket identifier associated with the request back to television 104.

In step 806, television 104 may initiate a communication channel between television 104 and remote support management system 102 with the ticket identifier. This may be performed a predetermined amount of time prior to the scheduled time.

In step 808, remote support management system 102 may establish the communication channel initiated by television 104. This may be performed in any suitable manner.

In step 810, remote support management system 102 may transmit a notification and the ticket identifier to computing device 106. The notification may indicate to the support technician that the remote control session is scheduled to begin at the scheduled time.

In step 812, computing device 106 may transmit a remote control request including the ticket identifier to remote support management system 102. This may be performed, for example, in response to the support technician associated with computing device 106 selecting an option included within the notification to participate in the remote control session.

Remote support management system 102 may verify the ticket identifier included in the remote control request and, as shown in step 814, transmit an acknowledgment of the remote control request to computing device 106 and establish a communication channel between computing device 106 and remote support management system 102.

In step 816, remote support management system 102 may bridge the first and second communication channels at the scheduled time. Data may then be transmitted between television 104 and computing device 106 by way of remote support management system 102 beginning at the scheduled time. For example, as shown in step 818, television 104 may transmit data representative of screen images and sounds to computing device 106 by way of the bridged communication channels. Likewise, as shown in step 820, computing device 106 may transmit remote control commands to television 104 by way of remote support management system 102.

Various examples of the methods and systems described herein will now be described in connection with FIGS. 9-15. These examples are merely illustrative of the many different implementations that may be realized in accordance with the methods and systems described herein.

Figure 9:
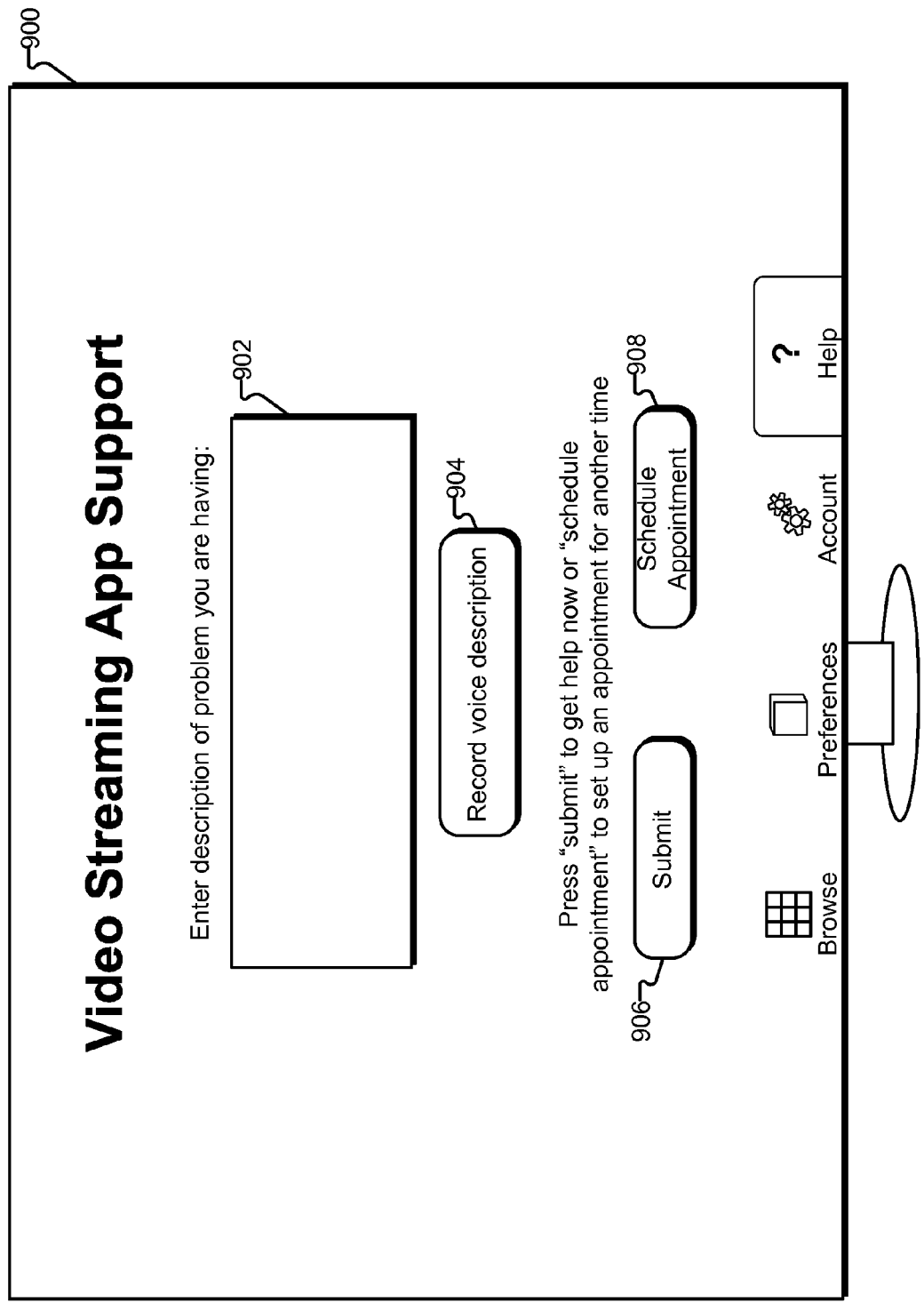

FIG. 9 illustrates an exemplary support interface 900 that may be provided (e.g., by remote support management system 102 and/or television 104) for presentation to a user by way of television 104. Support interface 900 may be presented by television 104 in response to the user selecting a help option, an occurrence of an error associated with television 104, and/or in response to any other event associated with television 104 as may serve a particular implementation. In the particular example of FIG. 9, support interface 900 is associated with a video streaming application configured to be executed by television 104.

As shown, support interface 900 may include a text entry field 902 into which a user may enter a description of an issue associated with the video streaming application. Alternatively, a user may select option 904 to record a voice description of the issue. To this end, television 104 may include or be connected to a means for text and/or audio entry (e.g., a virtual keyboard, a physical keyboard, and/or a microphone).

Once the description of the issue associated with the video streaming application has been entered, the user may select option 906 to submit a television support request to remote support management system 102. Alternatively, as will be described below, the user may select option 908 to schedule a support appointment for another time.

Figure 10:
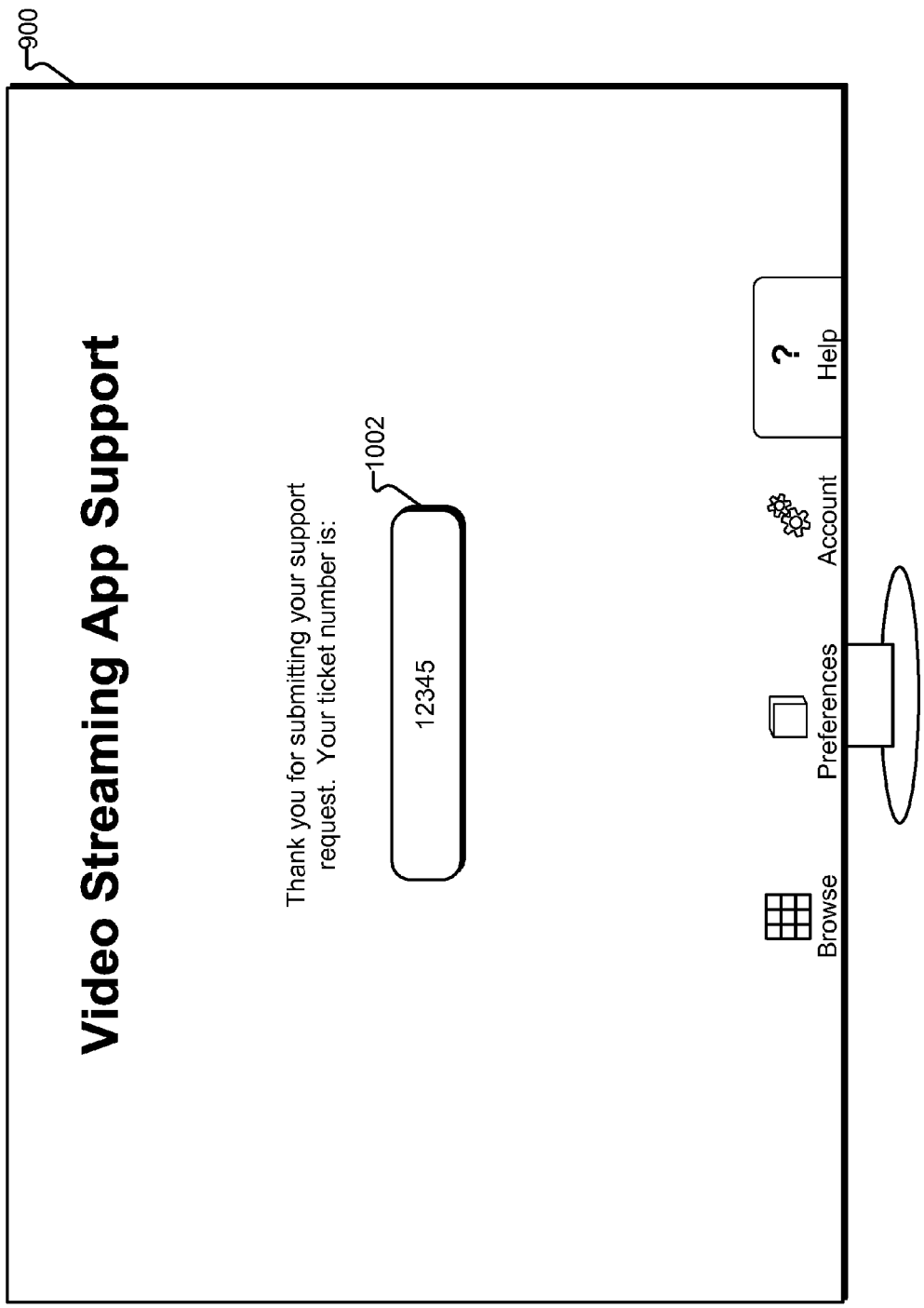

In response to the user selecting option 906 to submit the television support request, television 104 may transmit data representative of the television support request to remote support management system 102. In response, as described above, remote support management system 102 may generate a ticket identifier associated with the television support request. In some examples, remote support management system 102 may transmit data representative of the ticket identifier back to television 104 for presentation within support interface 900. For example, FIG. 10 shows that a graphical object 1002 representative of the ticket identifier (which, for purposes of this example, is a ticket number) may be presented within support interface 900 after the television support request has been submitted.

In some examples, remote support management system 102 may also transmit data representative of the ticket identifier to computing device 106. In some examples, this may be performed automatically in response to the generation of the ticket identifier. The ticket identifier may be presented to the support technician by way of computing device 106 any suitable manner.

Figure 11:
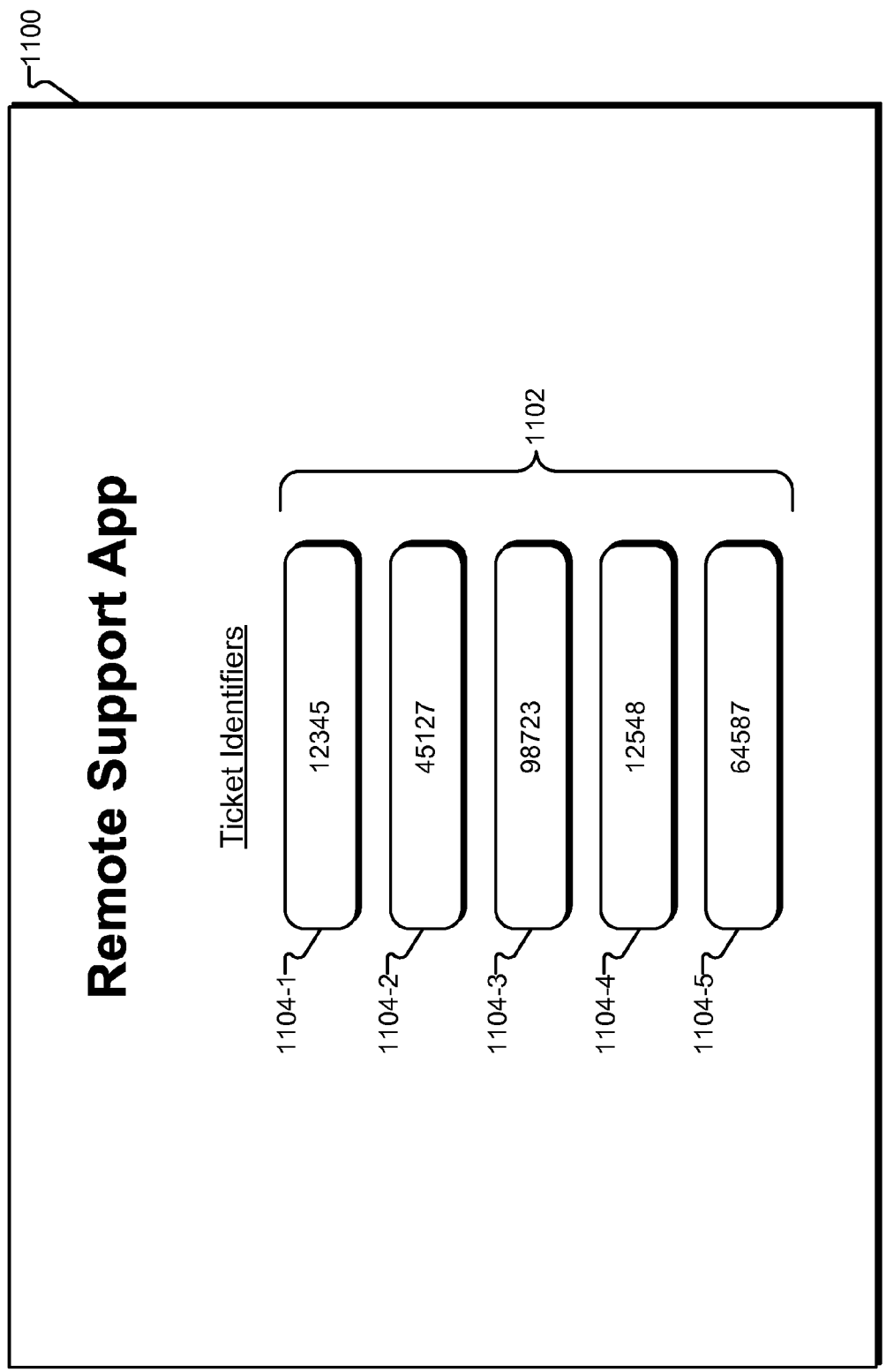

For example, FIG. 11 illustrates an exemplary interface 1100 that may be displayed by computing device 106. As shown, interface 1100 may be associated with a remote support application being executed by computing device 1100. Alternatively, interface 1100 may be presented within a web browser or in any other suitable manner as may serve a particular implementation. In some examples, interface 1100 may be provided by remote support management system 102.

As shown, interface 1100 may include a list 1102 of ticket identifiers. Each ticket identifier included within list 1102 may be associated with a distinct television support request. For example, list 1102 may include a plurality of a television support requests provided by a plurality of different users.

In some examples, remote support management system 102 may dynamically update list 1102 as ticket identifiers are generated. For example, FIG. 11 shows the interface 1100 has been dynamically updated to include a graphical object (i.e., graphical object 1104-1) representative of the ticket identifier associated with the television support request provided by way of support interface 900.

In some examples, each ticket identifier included within list 1102 may be represented by a selectable graphical object 1104 (e.g., graphical objects 1104-1 through 1104-5). The support technician may select a particular graphical object 1104 to initiate a remote control session of a television associated with the graphical object's corresponding ticket identifier. Additionally or alternatively, the support technician may select a particular graphical object 1104 to access information associated with the graphical object's corresponding ticket identifier (e.g., a description of the support issue associated with the ticket identifier).

To illustrate, the support technician may select graphical object 1104-1 to initiate a remote control session between the computing device 106 and television 104. Remote support management system 102 may detect the selection and, in response, establish a remote control session between computing device 106 and television 104. This may be performed in any of the ways described herein.

In some examples, the support technician may initiate the remote control session after the user has provided the ticket identifier directly to the support technician. For example, the user may submit a television support request in any of the ways described herein and receive a ticket number in response (e.g., by viewing graphical object 1002 shown in FIG. 10). The user may then communicate directly with the support technician (e.g., by calling the support technician by phone). During this communication, the user may provide the support technician with the ticket identifier (e.g., by telling the support technician what the ticket identifier is over the phone). The support technician may then select the appropriate ticket identifier from list 1102 in order to initiate the remote control session.

Figure 12:
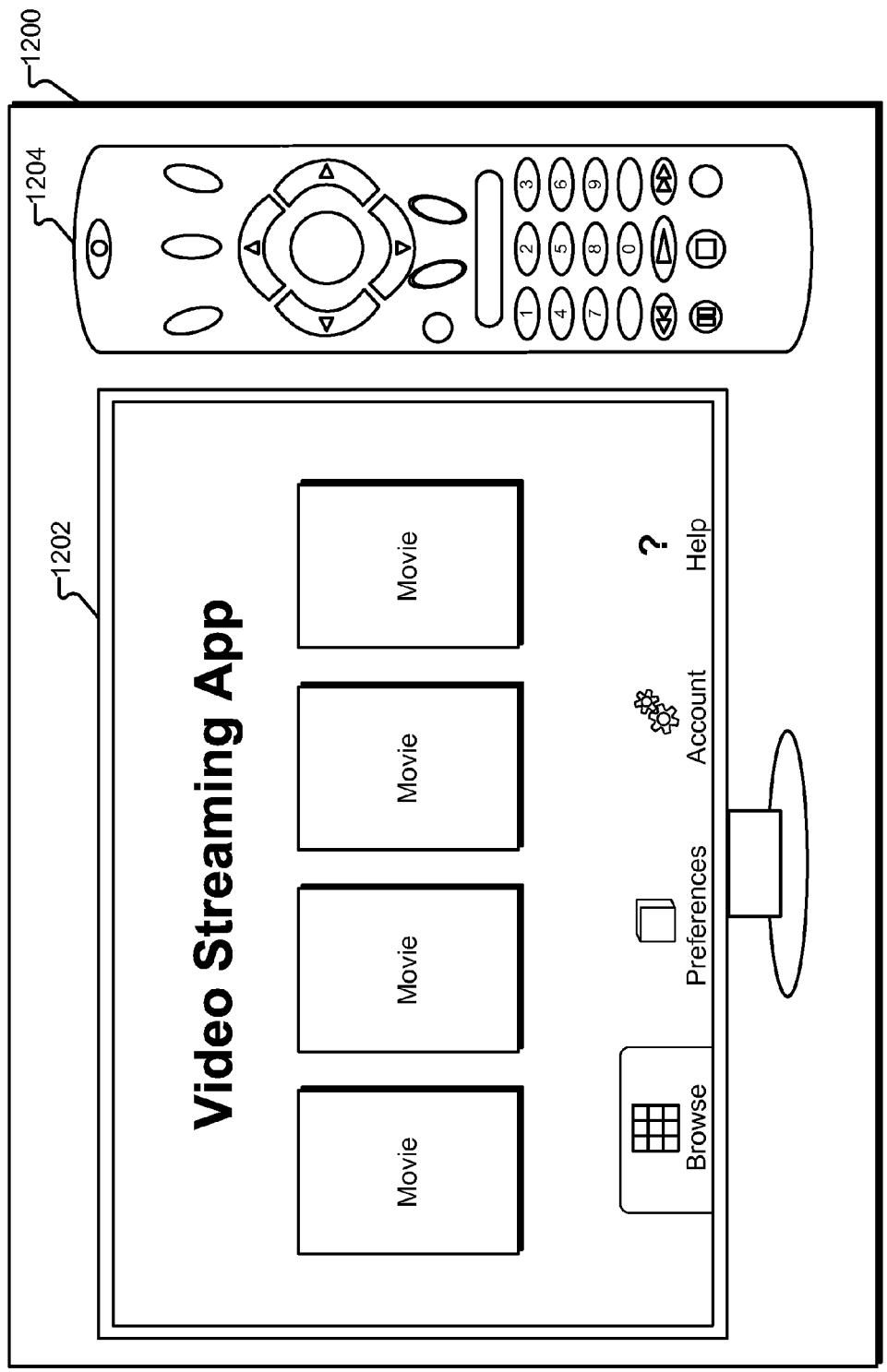

FIG. 12 illustrates an exemplary interface 1200 that may be presented by way of computing device 106 in response to the support technician selecting graphical object 1104-1 in order to initiate a remote control session between computing device 106 and television 104. As shown, interface 1200 may include a graphical representation 1202 of television 104. As described previously, screen images displayed by television 104 may be presented within graphical representation 1202 in substantially real time so that the support technician may view what is actually being displayed by television 104 as the support technician provides support during the remote control session. FIG. 12 shows that interface 1200 may additionally or alternatively include a graphical representation 1204 of a remote control device associated with television 104. The support technician may interact with the graphical representation 1204 of the remote control device in order to provide one or more remote control commands to television 104 during the remote control session.

FIG. 13 illustrates an exemplary interactive appointment scheduler 1302 that may be presented within support interface 900 in response to user selecting an option to schedule a support appointment (i.e., option 908 shown in FIG. 9). Interactive appointment scheduler 1302 is merely illustrative of the many different ways in which a user may schedule an appointment for the support technician to provide television support at a later date and/or time. Once a desired time has been selected by the user, the user may select option 1304 to submit a television support request that includes the scheduled time associated with the appointment.

As described previously, a notification may be provided to the support technician a predetermined amount of time prior to the scheduled time associated with the appointment. In this manner, the support technician may commit to providing the support at the scheduled time.

Figure 14:
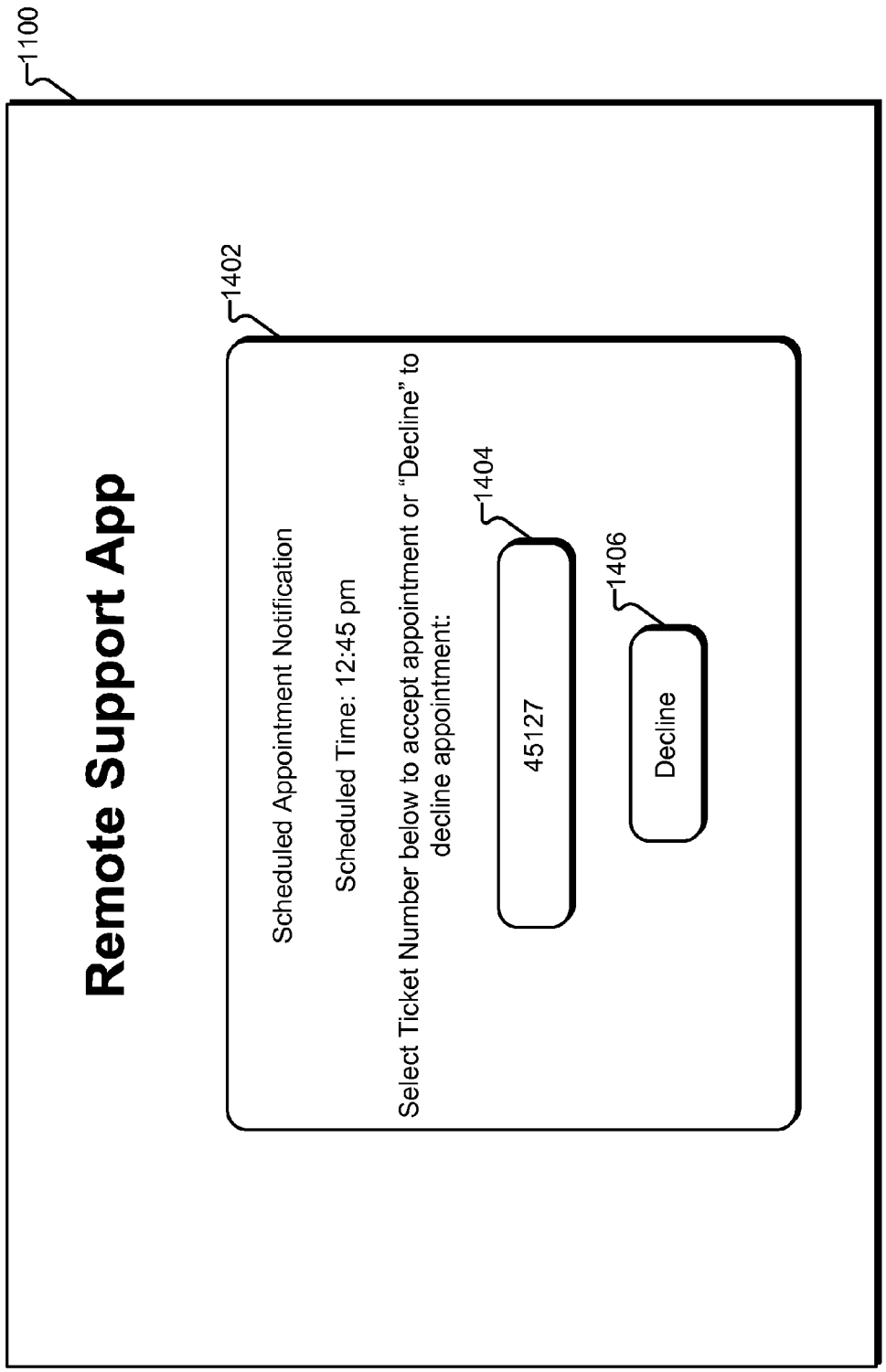

To illustrate, FIG. 14 shows an exemplary notification 1402 that may be presented within interface 1100 displayed by computing device 106 a predetermined amount of time prior to the scheduled time associated with the appointment. As shown, notification 1402 may provide information related to the scheduled appointment, an option 1404 to accept the appointment and initiate a remote control session with television 104, and an option 1406 that may be selected to decline the appointment. In some examples, if the user selects option 1406, remote support management system 102 may automatically provide a similar notification to another support technician so that the other support technician may participate in the remote control session.

In some examples, the user may be using television 104 when remote support management system 102 attempts to establish a remote control session at a scheduled time associated with an appointment. In this scenario, the user may desire to postpone the remote control session. To this end, remote support management system 102 may be configured to detect whether the television is displaying media content when remote support management system 102 attempts to establish the remote control session at the scheduled time. If remote support management system 102 detects that television 104 is displaying media content at the scheduled time, remote support management system 102 may present an option to delay beginning the remote control session by a predetermined amount of time. If the user selects the option, remote support management system 102 may delay the beginning of the remote control session by the predetermined amount of time.

Figure 15:
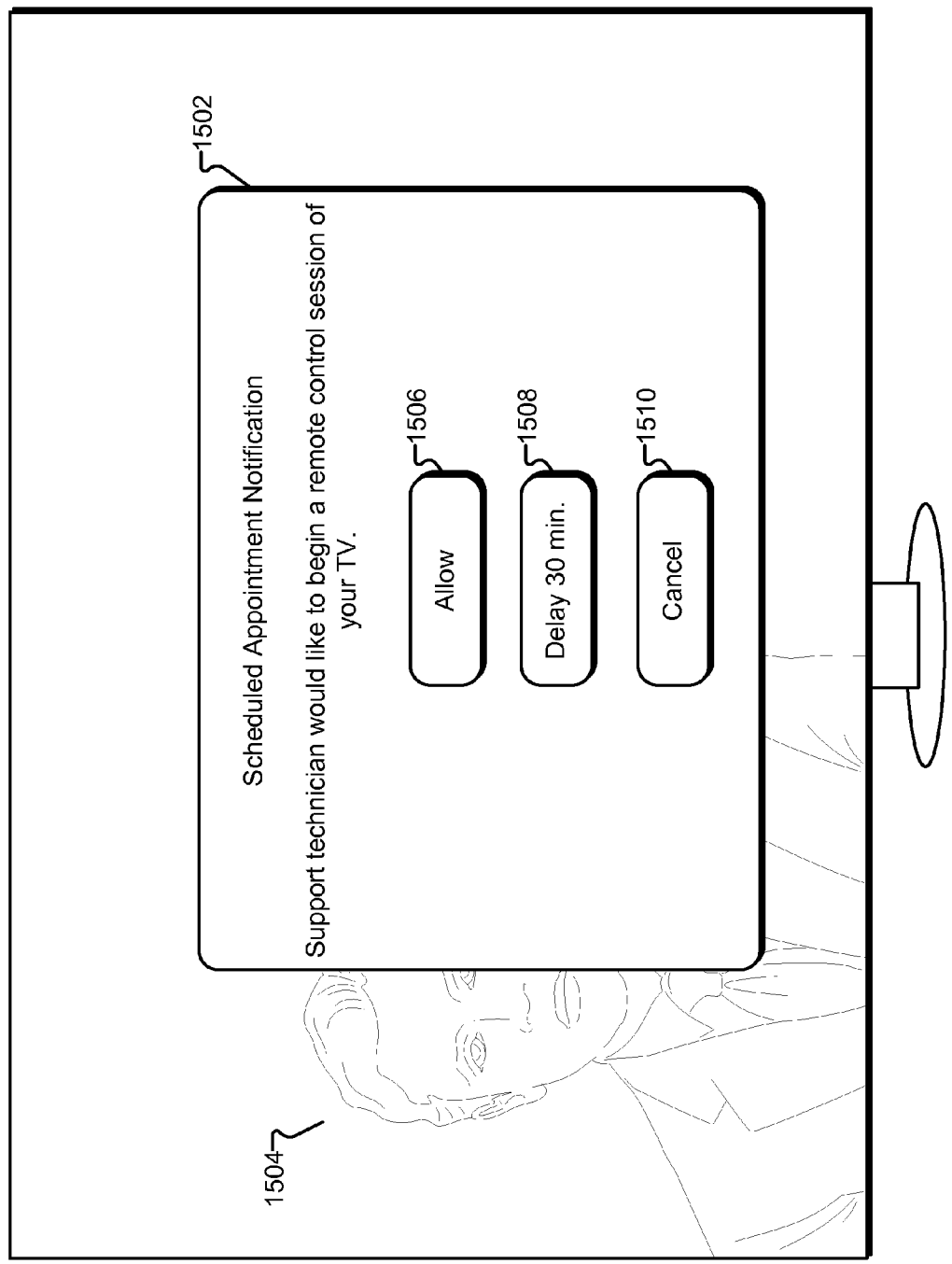

To illustrate, FIG. 15 shows an exemplary notification 1502 that may be provided for presentation by television 104 when remote support management system 102 detects that television 104 is displaying media content (e.g., a news program 1504) at a scheduled time associated with a remote control appointment. As shown, notification 1502 may indicate that a support technician would like to begin a remote control session with television 104. The user may select option 1506 to allow the remote control session to begin, option 1508 to delay the remote control session by a predetermined amount of time (e.g., thirty minutes), or option 1510 to cancel the appointment.

Figure 16:
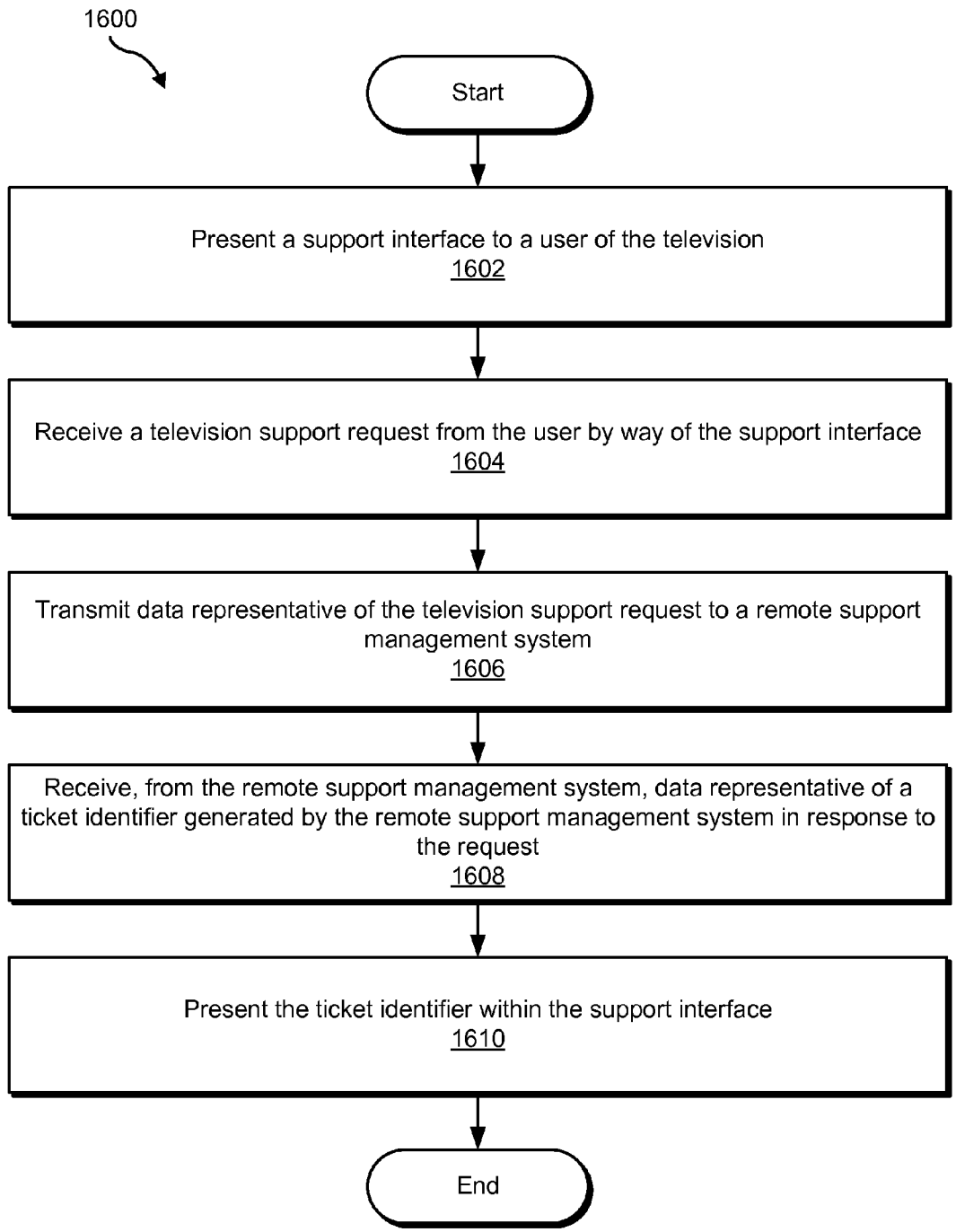
FIG. 16 illustrates another exemplary method of facilitating remote control of a television by a support technician according to principles described herein.

FIG. 16 illustrates another exemplary method 1600 of facilitating remote control of a television by a support technician. While FIG. 16 illustrates exemplary steps according to one embodiment, other embodiments may omit, add to, reorder, and/or modify any of the steps shown in FIG. 16. One or more of the steps shown in FIG. 16 may be performed by television 104 and/or any implementation thereof (e.g., an implementation in which television 104 is coupled to a network-enabled set-top box device or the like).

In step 1602, a television presents a support interface to a user of the television. Step 1602 may be performed in any of the ways described herein.

In step 1604, the television receives a television support request from the user by way of the support interface. Step 1604 may be performed in any of the ways described herein.

In step 1606, the television transmits data representative of the television support request to a remote support management system. Step 1606 may be performed in any of the ways described herein.

In step 1608, the television receives, from the remote support management system, data representative of a ticket identifier generated by the remote support management system in response to the request. Step 1608 may be performed in any of the ways described herein.

In step 1610, the television presents the ticket identifier within the support interface. Step 1610 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 17:
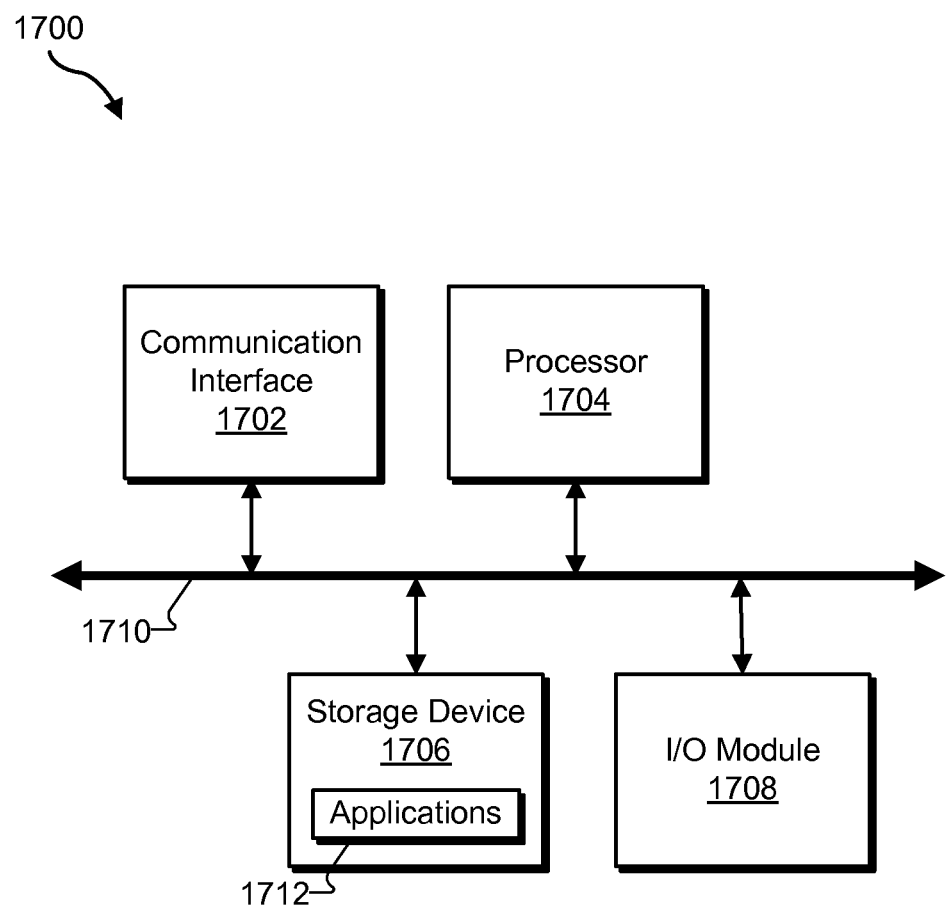
FIG. 17 illustrates an exemplary computing device according to principles described herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may be configured to receive user input and provide user output and may include any hardware, firmware, software, or combination thereof supportive of input and output capabilities. For example, I/O module 1708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1700. For example, one or more applications 1712 residing within storage device 1706 may be configured to direct processor 1704 to perform one or more processes or functions associated with detection facility 202, support session management facility 204, presentation facility 302, and/or support management facility 304. Likewise, storage facility 206 and/or storage facility 306 may be implemented by or within storage device 1706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a remote support management system, a television support request from a user of a television, the television support request comprising a television identifier associated with the television;
identifying, by the remote support management system in accordance with the television identifier, one or more attributes of the television;
generating, by the remote support management system in response to the television support request, a ticket identifier associated with the television support request; and
facilitating, by the remote support management system in accordance with the ticket identifier, remote control of the television by a support technician by way of a computing device associated with the support technician,
wherein the facilitating of the remote control of the television by the support technician by way of the computing device comprises:
providing a graphical representation of the ticket identifier for presentation within an interface displayed by the computing device;
detecting a selection by the support technician of the graphical representation of the ticket identifier presented within the interface;
establishing, in response to the selection by the support technician of the graphical representation of the ticket identifier, a remote control session between the computing device and the television by validating the ticket identifier after the selection by the support technician of the graphical representation of the ticket identifier to initiate the remote control session, the validating including determining that the ticket identifier represented by the graphical representation selected by the support technician matches the ticket identifier associated with the television support request; and
providing, based on the one or more attributes of the television, both a graphical representation of the television and an interactive graphical representation of a remote control device that is specific to the television for concurrent presentation within the interface displayed by the computing device, the graphical representation of the television specific to a make and a model of the television.

2. The method of claim 1, wherein the establishing of the remote control session between the computing device and the television further comprises:
establishing, in response to the television support request, a first communication channel between the television and the remote support management system;
receiving a request provided by the support technician by way of the computing device to initiate the remote control session, the request including the ticket identifier;
establishing, in response to the validating, a second communication channel between the computing device and the remote support management system; and
bridging the first and second communication channels.

3. The method of claim 1, wherein the television support request comprises a request for the remote control session to begin at a scheduled time and wherein the establishing of the remote control session between the computing device and the television further comprises:
establishing a first communication channel between the television and the remote support management system a first predetermined amount of time prior to the scheduled time;

providing a notification to the support technician by way of the computing device a second predetermined amount of time prior to the scheduled time, the notification including the ticket identifier;

receiving a request provided by the support technician by way of the computing device to initiate the remote control session at the scheduled time, the request including the ticket identifier;

establishing, in response to the validating, a second communication channel between the computing device and the remote support management system; and bridging the first and second communication channels at the scheduled time.

4. The method of claim 1, wherein:

the television support request comprises a request for the remote control session between the computing device and the television to begin at a scheduled time; and the facilitating of the remote control of the television by the support technician by way of the computing device further comprises attempting to establish the remote control session at the scheduled time.

5. The method of claim 4, further comprising:

detecting, by the remote support management system in response to attempting to establish the remote control session at the scheduled time, that the television is displaying media content; and presenting, by the remote support management system in response to the detecting that the television is displaying media content, an option to delay beginning the remote control session by a predetermined amount of time.

6. The method of claim 5, further comprising:

detecting, by the remote support management system, a selection by the user of the option; and delaying, by the remote support management system, the beginning of the remote control session by the predetermined amount of time.

7. The method of claim 4, further comprising:

providing, by the remote support management system, an interactive appointment scheduler for presentation within a support interface; and facilitating, by the remote support management system, selection by the user of the scheduled time by way of the interactive appointment scheduler.

8. The method of claim 1, wherein the facilitating of the remote control of the television by the support technician by way of the computing device further comprises:

detecting a selection by the support technician of a button included in the interactive graphical representation of the remote control device, the button associated with a remote control command; and transmitting, in response to the selection of the button, the remote control command to the television.

9. The method of claim 1, wherein the facilitating of the remote control of the television by the support technician by way of the computing device further comprises:

receiving data from the television representative of screen images in substantially real time as the screen images are displayed by the television; and dynamically providing the data representative of the screen images to the computing device as the data is received for presentation by the computing device.

10. The method of claim 1, further comprising:

providing, by the remote support management system, a support interface for presentation to the user by way of the television;

wherein the receiving of the television support request comprises receiving the television support request by way of the support interface.

11. The method of claim 1, wherein the television support request further comprises a recorded audio description of an issue associated with the television, the recorded voice description provided by the user by way of a support interface presented by way of the television.

12. The method of claim 1, further comprising:

providing, by the remote support management system, information representative of the identified one or more attributes to the support technician by way of the computing device.

13. The method of claim 12, further comprising customizing, by the remote support management system, the remote control of the television by the support technician by way of the computing device in accordance with the identified one or more attributes.

14. The method of claim 1, embodied as computer-executable instructions on at least one non-transitory computer-readable medium.

15. A system comprising:

a detection facility that receives a television support request from a user of a television, the television support request comprising a television identifier associated with the television, and identifies, in accordance with the television identifier, one or more attributes of the television; and a support session management facility communicatively coupled to the detection facility and that generates, in response to the television support request, a ticket identifier associated with the television support request, and facilitates, in accordance with the ticket identifier, remote control of the television by a support technician by way of a computing device associated with the support technician, wherein the support session management facility facilitates the remote control of the television by the support technician by way of the computing device by:

providing a graphical representation of the ticket identifier for presentation within an interface displayed by the computing device;

detecting a selection by the support technician of the graphical representation of the ticket identifier presented within the interface;

establishing, in response to the selection by the support technician of the graphical representation of the ticket identifier, a remote control session between the computing device and the television by validating the ticket identifier after the selection by the support technician of the graphical representation of the ticket identifier to initiate the remote control session, the validating including determining that the ticket identifier represented by the graphical representation selected by the support technician matches the ticket identifier associated with the television support request; and providing, based on the one or more attributes of the television, both a graphical representation of the television and an interactive graphical representation of a remote control device that is specific to the television for concurrent presentation within the interface displayed by the computing device, the graphical representation of the television specific to a make and a model of the television.

16. The system of claim 15, wherein:
the television support request comprises a request for the remote control session between the computing device and the television to begin at a scheduled time; and
the support session management facility facilitates the remote control of the television by the support technician by way of the computing device by attempting to establish the remote control session at the scheduled time.

17. The system of claim 16, wherein:
the detection facility further detects, in response to attempting to establish the remote control session at the scheduled time, that the television is displaying media content; and
the support section management facility further presents, in response to the detecting that the television is displaying media content, an option to delay beginning the remote control session by a predetermined amount of time.

18. The system of claim 17, wherein the support session management facility further:
detects a selection by the user of the option; and
delays the beginning of the remote control session by the predetermined amount of time.

19. The system of claim 16, wherein the support session management facility further:
provides an interactive appointment scheduler for presentation within a support interface; and
facilitates selection by the user of the scheduled time by way of the interactive appointment scheduler.

20. The system of claim 15, wherein the support session management facility facilitates the remote control of the television by the support technician by way of the computing device by:
detecting a selection by the support technician of a button included in the interactive graphical representation of the remote control device, the button associated with a remote control command; and
transmitting, in response to the selection of the button, the remote control command to the television.

21. The system of claim 15, wherein the support session management facility further facilitates the remote control of the television by the support technician by way of the computing device by:
receiving data from the television representative of screen images in substantially real time as the screen images are displayed by the television; and
dynamically providing the data representative of the screen images to the computing device as the data is received for presentation by the computing device.

* * * * *